United States Patent Office 3,428,538
Patented Feb. 18, 1969

---

3,428,538
METHOD FOR PREPARING AZIRIDINES BY PHOTOLYSIS OF TRIAZOLINES
Peter Scheiner, 29 Hamilton Ave., Princeton, N.J. 08540
No Drawing. Filed Jan. 13, 1966, Ser. No. 520,348
U.S. Cl. 204—158       6 Claims
Int. Cl. B01j 1/10; C07d 23/06

This invention relates to aziridines and its object is to provide a new method of synthesizing aziridines (ethylenimines).

It is well known that aziridines possess valuable properties which render them useful for a wide variety of purposes. Aziridine is used industrially to alter the properties of hydroxylic polymers; certain derivatives of aziridine may be copolymerized and cross-linked with other resins to produce polymers (United States Patent Nos. 3,115,482 and 3,115,490); methyl derivatives of aziridine, and of 1,2 butylenimine 2,2-dimethylenimine and 2,2-dimethyl-3-propylethylenimine, are used as additives in the production of mold and foundry cores (French Patent No. 1,334,477); other aziridine derivatives are used as hardening agents for photographic gelatin emulsions (British Patent No. 918,950) and to waterproof, and increase the wet strength of, cellulose fibers (United States Patent No. 3,100,789); aziridine, and some of its derivatives, including its N-acetyl and many N-acyl derivatives, have been reported to possess carcinogenic activity (An Introduction to the Chemistry of Heterocyclic Compounds, R. M. Acheson, p. 14); while others have been used in the preparation of inactivated foot-and-mouth disease vaccines (Journal of Hygiene, vol. 61, 337–344 (1963)).

Heretofore, N- and C-alkyl derivatives of aziridine usually were synthesized by heating N- and C-alkyl substituted aminoethyl sulphuric acid with concentrated aqueous sodium hydroxide according to the following reaction, wherein R represents H and alkyl:

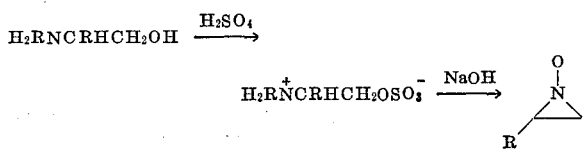

Another prior method is the cyclisation of N-, including alkyl- and arylsubstituted, and C-, including alkyl- and aryl-substituted, 2-chloro- or 2-bromo-ethylamine by silver oxide or, preferably, concentrated aqueous potassium hydroxide, e.g.,

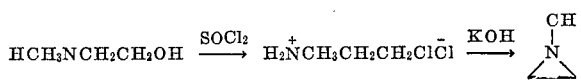

The utility of both of the foregoing described prior procedures, heretofore the main ones commonly used to synthesize aziridine derivatives, is severely limited by virtue of the fact that the reagents, concentrated aqueous sodium and potassium hydroxide and silver oxide, used in said reactions, and the use of heat, prevent the incorporation into the aziridine compound synthesized according to either of such methods, of a great many desirable common chemical functional groups, e.g., aldehydes, ketones, halogens, carbamates, because such chemical groups, if present as substituents on either aminoethyl sulphuric acid or 2-chloro- or 2-bromo ethylenimine would be destroyed by said reagents during the reaction, and which chemical groups are exceedingly difficult, and in some cases practically impossible, to introduce into aziridine compounds after they have been formed, due to the extreme sensitivity of the aziridine ring to the chemical reactions required to be performed to incorporate such groups in aziridines. Also, these methods are costly due to the fact that the yields, which depend largely upon, and vary according to the nature of the N- and C-substituents, are generally very low, in most cases substantially below 50%.

Another prior method of synthesizing compounds containing the aziridine ring involves the reaction of alkyl or aryl magnesium halides with alkyl aryl ketoximes, e.g.,

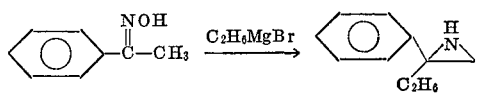

This method has very limited practical utility since the employment of a Grignard reagent in the reaction excludes the presence of active hydrogen groups, e.g., alcohols, acids, amines, mercaptans, and carbonyl groups, e.g., ketones, aldehydes, esters, carbamates.

There have been attempts in the past, the first as early as two decades ago, to thermally decompose certain 1-aryl-1,2,3-Δ²-triazolines to produce their corresponding aziridines. They all turned out to be unsatisfactory as a possible useful method for synthesizing aziridines mainly because pyrolysis of such triazolines produced large quantities of isomeric anil compounds. My investigations have shown that pyrolysis of the p-bromophenyl azidecyclopentene adduct gave the isomeric anil as the only product isolated; pyrolysis of the phenyl azide-N-phenylmaleimide and p-bromophenyl azide-norbornene adducts produced a mixture of aziridine and isomeric anil products, the latter being predominant; and pyrolysis of 3-phenyl-3,4,5-triazatricyclo[5.2.1.0$^{2,6}$]dec-4-ene - 2,6 - dicarboxylic acid anhydride gave mainly tars.

I have discovered that chemical compounds containing a 1,2,3-Δ²-triazoline ring can readily be photodecomposed to yield their corresponding aziridines, uncontaminated by objectionable side products, by irradiating a solution of the triazoline in an inert solvent with ultraviolet light. The reaction is carried out at a temperature which will vary somewhat according to the identity of the materials under treatment. The reaction temperature is controlled, if necessary, so that it will not result in the pyrolysis of the reactants and is normally not in excess of ordinary room temperatures. The reaction is complete when evolution of nitrogen gas ceases. Photolysis of these triazolines according to my invention produced only the corresponding aziridine, uncontaminated by side products.

My invention provides a new and facile method for the preparation of aziridines and one of its major advantages is that it opens up a new synthetic entry into the aziridine series which makes possible the synthesis of aziridine derivatives containing chemical functonal groups whch heretofore were extremely difficult, if not practically impossible, to synthesize.

Some other noteworthy attributes and advantages of my invention include its ease and simplicity of operation; mildness of its reaction conditions; and elimination of side products and other contaminants.

Triazolines which I have converted to aziridines, according to the method of my invention, include, without limitation thereto, those which may be represented by the following general reaction formula:

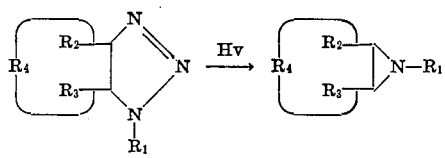

in which $R_1$ represents a member of the group consisting of hydrogen, alkyl, aryl, acyl and siliconalkyl, $R_2$ represents a member of the group consisting of hydrogen, alkyl, aryl, acyl and cyano, $R_3$ represents a member of the group consisting of hydrogen, alkyl, aryl and alkylvinyl, and $R_4$ represents a member of the group consisting of cycloalkyl and bicycloalkyl.

In accordance with the practice of my invention, a solution of a 1,2,3-$\Delta^2$-triazoline in an inert solvent, e.g., acetone, toluene and p-dioxane, is irradiated with ultraviolet light. Photolytic conversion of triazoline substrate into its corresponding aziridine is complete and the irradiation is terminated when the nitrogen evolution ceases. The reaction solution is cooled during the irradiation period to prevent pyrolysis of the reactants. In illustrative examples numbered I and II below, the reaction was carried out in a large Pyrex test tube with a gas outlet side arm equipped with an internal cold-finger condenser immersed in the triazoline solution during the course of the reaction. The reaction vessel was irradiated with a General Electric sun lamp placed approximately 10 cm. from the reaction vessel which was magnetically stirred during irradiation. Under these conditions, the temperature of the solution did not rise above 35° C. The volume of nitrogen evolved during irradiation was measured at atmospheric pressure by means of a gas buret. The beginning of each reaction was marked by a one or two minute induction period during which time no gas evolution was observed. After the evolution of the theoretical volume, further evolution of nitrogen gas was not observed and the irradiation was then terminated and the aziridine recovered.

The triazoline starting material used in illustrative examples numbered III and IV below decomposed very slowly under the above conditions. Rapid photolytic decomposition of these compounds was achieved by irradiation of their solutions in a 50 ml. flask fitted with an internal ultraviolet light source. External cooling was provided by means of a water bath and the irradiation was continued until no further evolution of the theoretical volume of nitrogen gas was observed.

Example I.—Preparation of 3-p-bromophenyl-3-azatricyclo [3.2.1.0$^{2,4}$]-octane A solution of 8.2 g. (0.028 mole) of 3-p-bromophenyl-3,4,5-triazatricyclo [5.2.1.0$^{2,6}$] dec-4-ene in 40 ml. of acetone was irradiated for 24 hr. in the manner described above. After the evolution of nitrogen was completed, removal of the solvent yielded yellow-brown crystals, M.P. 101–110°. Recrystallization from petroleum ether (30–60° gave 6.4 g. (86%) of white crystals, M.P. 113–115°. Three additional crystallizations from the same solvent gave the analytical sample, M.P. 115–116°.

*Analysis.*—Calcd. for $C_{13}H_{14}BrN$: C, 59.10; H, 5.34; N, 5.30. Found: C, 59.28; H, 5.31; N, 5.27.

Example II.—Preparation of 3-phenyl-3-azatricyclo [3.2.1.0$^{2,4}$] octane-2,4-dicarboxylic acid anhydride.

3.01 g. (0.0106 M) of the corresponding triazoline (3-phenyl-3,4,5-triazatricyclo [5.2.1.0$^{2,6}$] dec-4-ene-2,6-dicarboxylic acid anhydride) dissolved in 25 ml. of acetone was irradiated in the manner described above. After evolution of nitrogen ceased, the solvent was evaporated and the product collected, 2.70 g., M.P. 155–160°. Three crystallizations from petroleum ether (60–90°)-ethyl acetate (1:1) yielded a product melting from 161–162°. The infrared spectrum of this compound showed no adsorption in the C=N region, but did show adsorption at 1185 cm.$^{-1}$. In addition to the aromatic protons, the n.m.r. spectrum showed a single peak (two protons, bridgehead) at $\tau$ 6.9 and a complex multiplet (six protons) from $\tau$ 7.6–8.7.

*Analysis.*—Calcd. for $C_{13}H_{13}NO_3$: C, 70.58; H, 5.13; N, 5.49. Found: C, 70.57; H, 5.32; N, 5.78.

Example III.—Preparation of 3-carbethoxy-3-azatricyclo (3.2.1.0$^{2,4}$) octane 1.00 g. (0.0048 M) of 3-carbethoxy-3,4,5-triazatricyclo (5.2.1.0$^{2,6}$) dec-4-ene was dissolved in 25 ml. of acetone and irradiated in the manner described above. After completion of the gas evolution, the solvent was removed and 0.82 g. (95%) of a pale yellow liquid was obtained. Distillation of this material occurred at 99–100° (2.4 mm.), $n^{25}D$ 1.4841. The infrared spectrum of this compound (3-carbethoxy-3-azatricyclo [3.2.1.0$^{2,4}$] octane) showed no absorption in the C=N region.

*Aanalysis.*—Calcd. for $C_{10}H_{15}NO_2$: C, 66.27; H, 8.34; N, 7.73. Found: C, 66.43; H, 8.56; N, 7.98.

Example IV.—Preparation of 6-p-bromophenyl-6-azabicyclo [3.1.0] hexane 3.85 g. (0.0145 M) of 2-p-Bromophenyl-2,3,4-triazabicyclo [3.3.0] oct-3-ene dissolved in 25 ml. of acetone was irradiated in the manner described above until nitrogen evolution ceased. Evolution of 359 ml. of nitrogen was observed (theoretical volume, 362 ml.). Removal of the solvent under reduced pressure yielded 3.38 g. of pale yellow solid, M.P. 66–69°. Three crystallizations from pentane (Dry Ice-acetone bath cooling) gave 2,12 g. of a white solid, M.P. 73–74°.

*Aanalysis.*—Calcd. for $C_{11}H_{12}BrN$: C, 55.49; H, 5.08; N, 5.88. Found: C, 55.73; H, 5.38; N, 5.84.

The infrared spectrum of this compound showed no significant absorption in the 1600–1700 cm.$^{-1}$ region, but did show absorption at 1190 cm.$^{-1}$. An identical infrared spectrum was exhibited by a sample of this compound after it was heated (oil bath) at 130–140° C. for 1 hour.

A 1.25 gram sample was refluxed with 70 ml. of dilute sulphuric acid for 1 hr. After cooling, the solution was made basic to litmus with 10% sodium hydroxide solution and extracted with three 20-ml. portions of ether. The dried extracts (magnesium sulfate) were evaporated to dryness, yielding 1.16 g. of viscous oil. The infrared spectrum (3% in chloroform) showed peaks at 3615 and 3430 cm.$^{-1}$, with no absorption in the carbonyl region.

Other triazolines that can be used as starting materials in the practice of my invention are listed by way of illustration, but not of limitation, as follows:

1-benzenesulfonyl-4,5-dichloro-$\Delta^2$-1,2,3-triazoline

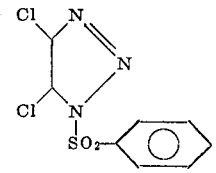

4-acetoxy-5-phenoxyl-1-vinyl-$\Delta^2$-2,2,3-triazoline

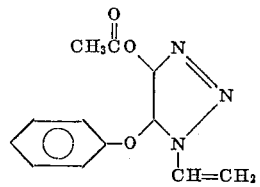

4-benzyl-4-bromo-1-methyl-5-vinyl-$\Delta^2$-1,2,3-triazoline

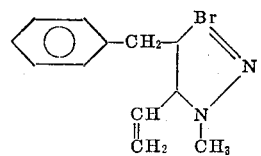

7-m-aminophenyl-2-trimethylsilyl-2,3,4,7-tetraazabicyclo
[3.3.0] oct-3-ene-6,8-dione

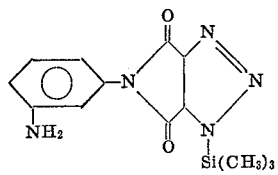

1-chlorocarbonyl-4-carboxamido-5-cyclopropyl-Δ²-1,2,3-
triazoline

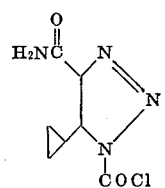

1-bromo-2-cyano-2,3,4-triaza-8-thiabicyclo [3.3.0] octa-
3,6-diene

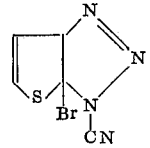

2,3-(1-carbathoxy-Δ²-1,2,3-triazolino) benzofuran

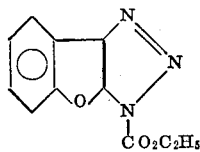

1-formyl-11-oxa-2,9-bis-triphenylmethyl-2,3,4,7,8,9-
hexaazatricyclo [5.5.0$^{1,5}$.0$^{6,10}$] undeca-3,7-diene

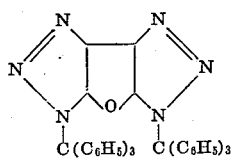

2-acetyl-1,5-difluor-6,6,7,7-tetrachloro-2,3,4-triaza-
bicyclo [3.2.0] hept-3-ene

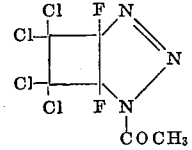

5,5-diphenyl-4-keto-1-methanesulfonyl-Δ²-1,2,3-triazoline

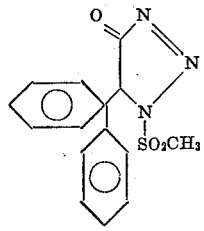

1-α-naphtyl-4-(N-pyrrolidin-2-on-yl)-Δ²-1,2,3-triazoline

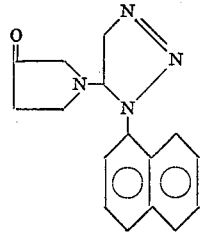

1-(N-morpholino)-2-thiobenzoyl-2,3,4-triazabicyclo
[3.3.0] oct-3-ene

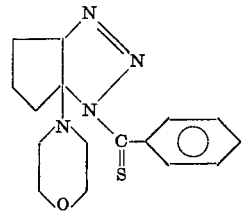

1-(9-acridinyl)-4-mercapto-Δ²-1,2,3-triazoline

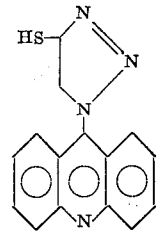

4-aminomethyl-5-p-anisyl-5-methyl-Δ²-1,2,3-triazoline-
1-acetic acid

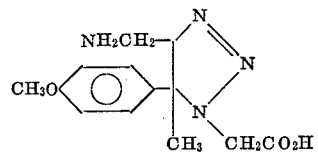

7-carboxamido-7,8,9-triazabicyclo[4.3.0]nona-3,8-diene-
2,5-dione

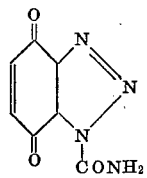

2-(2-propyl)-1-hydroxy-2,3,4-triazabicyclo[4.2.0]nona-
3-en-9-one

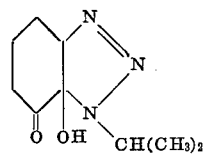

R-(2-hydroxy-3-butenyl)-2,3,4-triaza[4.4]
spiro-non-3-ene

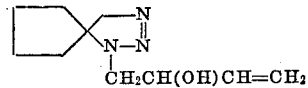

7

1-cyclopropyl-4-p-toluenesulfonyl-$\Delta^2$-1,2,3-triazoline

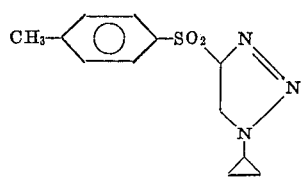

3-(p-azidophenyl)-2,9,9-trimethyl-3,4,5-triazatricyclo-[6.1.1.0$^{2,6}$] dec-4-ene

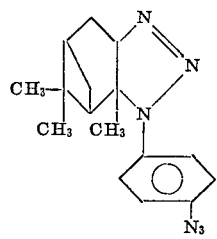

1,1-bis-(N-$\Delta^2$-1,2,3-triazolino) ferrocene

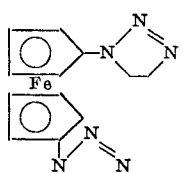

5-oxa-10,11,12-triazatricyclo [7.3.0$^{4,6}$.0$^{1,9}$] dodec-10-ene

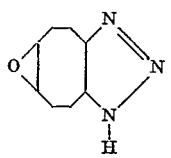

N-(3,4,5-trinitrobenzenesulfonyl) triatriazalinethione

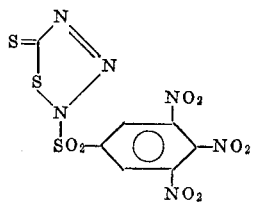

1,3-bis-(N-$\Delta^2$-1,2,3-triazolino)-1,3-propanedione

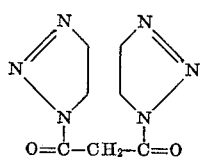

1,2-bis-(4,5-dicarboxy-N-$\Delta^2$-1,2,3-triazolino)ethane

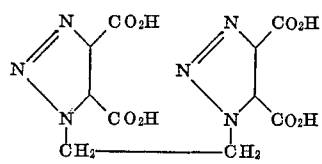

8

4,5-($\Delta^2$-1,2,3-triazolino) testosterone

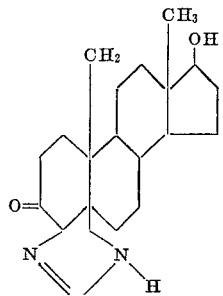

tetrakis-(1-phenyl-$\Delta^2$-1,2,3-triazolino) vitamin A

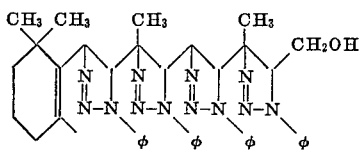

N,N$^1$,N$^2$-tritriazolinothiophosphoramide

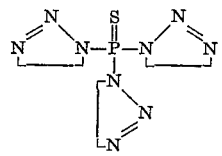

2,4,6-tri(N-$\Delta^2$-1,2,3-triazolino)-1,3,5-triazine

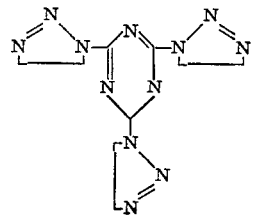

N,N-diethyl-N$^1$-morpholino-N$^2$-(4,4,5,5-tetracyano-$\Delta^2$-1,2,3-triazolino) phosphoramide

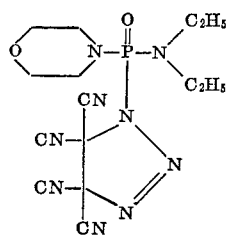

What I claim is:
1. The method of making a substituted aziridine which comprises irradiating a solution of the corresponding substituted 1,2,3-$\Delta^2$-triazoline with ultraviolet light until evolution of nitrogen gas terminates.
2. The method of making an aziridine according to claim 1 in which the triazoline reactant accords with the following formula:

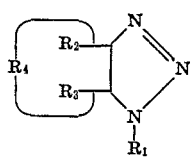

in which
$R_1$ represents a member of the group consisting of hydrogen, alkyl, aryl, acyl and siliconalkyl,
$R_2$ represents a member of the group consisting of hydrogen, alkyl, aryl, acyl and cyano,
$R_3$ represents a member of the group consisting of hydrogen, alkyl, aryl and alkylvinyl, and $R_4$ represents a member of the group consisting of cycloalkyl and bicycloalkyl.

3. The method of making an aziridine according to claim 2 in which the triazoline starting material is dissolved in an inert organic solvent.

4. The method of making an aziridine according to claim 3 in which the inert organic solvent is selected from the group consisting of acetone, toluene and p-dioxane.

5. The method of making an aziridine according to claim 1 in which the triazoline starting material is dissolved in an inert organic solvent.

6. The method of making an aziridine derivative according to claim 5 in which the inert organic solvent is selected from the group consisting of acetone, toluene and p-dioxane.

References Cited

UNITED STATES PATENTS

| 3,169,972 | 2/1965 | Paquette | 204—158 X |
| 3,190,886 | 6/1965 | Carboni | 204—158 X |

HOWARD S. WILLIAMS, *Primary Examiner.*